(12) United States Patent  
Shimizu et al.

(10) Patent No.: US 8,937,126 B2  
(45) Date of Patent: Jan. 20, 2015

(54) TERNARY BLENDS OF ALIPHATIC POLYCARBONATE DERIVED FROM CARBON DIOXIDE, AND PROCESS FOR PRODUCING SAME

(75) Inventors: Hiroshi Shimizu, Ibaraki (JP); Yongjin Li, Hangzhou (CN)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 123 days.

(21) Appl. No.: 13/127,530

(22) PCT Filed: Nov. 5, 2009

(86) PCT No.: PCT/JP2009/068881  
§ 371 (c)(1),  
(2), (4) Date: Nov. 21, 2011

(87) PCT Pub. No.: WO2010/053110  
PCT Pub. Date: May 14, 2010

(65) Prior Publication Data  
US 2012/0053282 A1 Mar. 1, 2012

(30) Foreign Application Priority Data  
Nov. 5, 2008 (JP) .................................. 2008-284212

(51) Int. Cl.  
C08L 33/08 (2006.01)  
C08L 33/10 (2006.01)  
(Continued)

(52) U.S. Cl.  
CPC .................. *C08G 64/32* (2013.01); *C08J 3/005* (2013.01); *C08L 25/02* (2013.01); *C08L 69/00* (2013.01); *C08L 67/00* (2013.01); *C08L 33/10* (2013.01); *C08J 2369/00* (2013.01)  
USPC ............ 524/186; 525/187; 525/166; 525/176

(58) Field of Classification Search  
CPC .......... C08L 69/00; C08L 33/10; C08G 64/02  
USPC .................................. 525/166, 176, 186, 187  
See application file for complete search history.

(56) References Cited

U.S. PATENT DOCUMENTS 3,742,088 A * 6/1973 Holder et al. .................. 525/143  
4,743,654 A * 5/1988 Kyu et al. ...................... 525/148  
(Continued)

FOREIGN PATENT DOCUMENTS

CN 100999602 A 7/2007  
CN 101238177 A 8/2008  
(Continued)

OTHER PUBLICATIONS

Gajria (Miscibility and biodegradability of blends of poly(lactic acid) and poly(vinyl acetate). Polymer, 1996, 32(3), pp. 437-444).*  
(Continued)

*Primary Examiner* — Brieann R Fink

(57) ABSTRACT

Disclosed is a novel ternary aliphatic polycarbonate blend derived from carbon dioxide, which is mainly composed of an aliphatic polycarbonate. Also disclosed is a process for producing the ternary aliphatic polycarbonate blend. A methacrylic resin or an aliphatic polyester is incorporated, as a second component, into an aliphatic polycarbonate to produce a blend, and a vinyl resin is added, as a third component, to the blend at a specified ratio, thereby producing a novel ternary aliphatic polycarbonate blend derived from carbon dioxide and having excellent mechanical properties that cannot be achieved by binary blends.

11 Claims, 4 Drawing Sheets

(51) Int. Cl.
*C08L 69/00* (2006.01)
*C08G 64/02* (2006.01)
*C08J 3/00* (2006.01)
*C08G 64/32* (2006.01)
*C08L 25/02* (2006.01)
*C08L 67/00* (2006.01)

(56) References Cited

U.S. PATENT DOCUMENTS

| | | | |
|---|---|---|---|
| 4,749,755 A | | 6/1988 | Buysch et al. |
| 4,874,030 A | * | 10/1989 | Kuphal et al. ............... 164/34 |
| 4,910,256 A | | 3/1990 | Prier |
| 4,912,149 A | * | 3/1990 | Robeson et al. ............. 524/501 |
| 5,612,281 A | * | 3/1997 | Kobayashi et al. ........ 428/32.11 |
| 6,573,340 B1 | | 6/2003 | Khemani et al. |
| 2010/0160505 A1 | | 6/2010 | Kumazawa et al. |

FOREIGN PATENT DOCUMENTS

| | | |
|---|---|---|
| JP | S61-285251 A | 12/1986 |
| JP | H02-258828 A | 10/1990 |
| JP | 2008-63577 A | 3/2008 |
| JP | 2008-255349 A | 10/2008 |
| WO | 2007/125039 A1 | 11/2007 |
| WO | WO 2007125039 A1 * | 11/2007 |

OTHER PUBLICATIONS

Crispim (Solvent effects on the miscibility of poly(methyl methacrylate)/poly(vinyl acetate) blends I: Using differential scanning calorimetry and viscometry techniques. Polymer, 1999, 40, pp. 5129-5135).*
S. Inoue et al., J. Polym. Sci., Polym. Lett., Ed., 7, 287 (1969).
S. Inoue et al., Makromol. Chem., 130, 210 (1969).
X. L. Wang et al., J. Biomed. Mater. Res., B, 78B, 373 (2007).
Xudong Shi et al., Eur. Polym. J., 43, 4852 (2007).
International Search Report for PCT Application No. PCT/JP2009/068881, Feb. 9, 2010.
Written Opinion of International Searching Authority for PCT Application No. PCT/JP2009/068881, Feb. 9, 2010.
Hsieh, "The study to improve the intermiscibility of polycarbonate and polymethylmethacrylate using phenylethene/acrylonitrile random copolymer as solubilizer", Jan. 20, 1998.
Chinese Office Action for Chinese Patent Application No. 200980140208.0, SIPO, Dec. 5, 2013.
Chinese Search Report for Chinese Patent Application No. 200980140208.0, SIPO, Dec. 5, 2013.

* cited by examiner (2)

PPC/PMMA/PVAc = 70/30/5

(1)

PPC/PMMA = 70/30

TERNARY BLENDS OF ALIPHATIC POLYCARBONATE DERIVED FROM CARBON DIOXIDE, AND PROCESS FOR PRODUCING SAME

TECHNICAL FIELD

The present invention relates to an aliphatic polycarbonate blend derived from carbon dioxide and a process for producing the same.

BACKGROUND ART

As for the attempt at the above, nearly 40 years ago, it has been reported that an aliphatic polycarbonate (APC) can be obtained through alternating copolymerization of carbon dioxide and epoxide in the presence of a catalyst (see, Non-Patent Documents 1, 2).

Reaction scheme (1) is represented by the following formula:

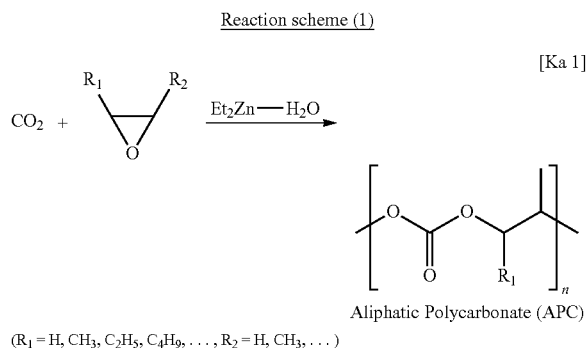

The above APC is, as shown in the reaction scheme (1), characterized in that it takes carbon dioxide ($CO_2$) in the polymer backbone structure.

According to the reaction scheme, a wide variety of aliphatic polycarbonates (APC) can be produced by variously selecting the polymerization catalyst and by selecting the type of the epoxide. At first, the catalyst was a diethylzinc-water system; however, zinc-based different systems and a wide variety of catalyst systems containing any other metal have become investigated, and still at present, searches for catalyst systems having a higher activity are continuing.

With the recent upsurge in concerns about global warming, the aliphatic polycarbonate (APC) has entered the limelight. In case where this can be widely utilized as a plastic material in industry, then there would be an extremely high possibility for it to be the dominant technology of $CO_2$ fixation.

At present, as a measure against global warming, $CO_2$ reduction is claimed for in the world, and at the present time for $CO_2$ fixation, a technology of capturing it in the depths of the ground or in deep waters is found to be useful for $CO_2$ fixation. However, even in Japan alone, the amount of $CO_2$ emissions from power stations and steel plants is over 500,000,000 tons a year, and construction of $CO_2$ fixation technology is urgently needed, for which the above-mentioned reaction is noteworthy as one measure.

It is said that, in China, test production of poly(propylene carbonate) (PPC) shown by the following reaction scheme 2 has been tried by defining the epoxide in the reaction scheme 1 to an inexpensive monomer, propylene oxide for advanced industrialization of aliphatic polycarbonates (APC).

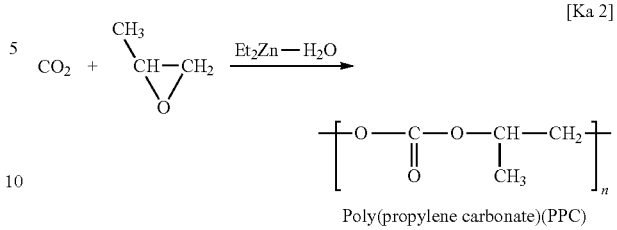

For PPC in China shown by the above reaction scheme 2, plant production has also been tried with a catalyst system differing from the diethylzinc-water ($Et_2Zn$—$H_2O$) system.

The molecular weight of relatively high-quality PPC produced in such pilot plants is already on a technological level of more than 100,000, and the weight-average molecular weight (Mw) thereof is more than 400,000.

However, at the moment, the glass transition temperature (Tg) of PPC is around 30° C., and the property thereof is soft and rubbery plastic. In addition, its heat resistance is extremely poor, and it readily decomposes at around 200° C. Specifically, as for the mechanical properties thereof, it may be said that PPC has an extremely low elastic modulus and is excellent in elongation at break. The properties are similar to those of adhesive. For example, when once shaped in pellets after production of PPC but while stored as piled up, a phenomenon will occur that the pellets will soon adhere to each other and could not be separated. Having the properties, for example, in case of PPC is formed into a wrapping film; the films will stick together and could be separated with difficulty into the original individual films, after piling the films together for a while. Many properties of PPC that have been heretofore known often serve as impediments to practical use thereof, and it is necessary to improve the properties.

In case where a technology of modifying the current properties of PPC could be developed, then creation of some novel materials could be expected via PPC.

Under the technical background as above, some researches to compounding PPC with various resins so as to elevate as much as possible the glass transition temperature of PPC thereby increasing the heat resistance thereof and improving the mechanical properties thereof are being made.

For example, there is an invention of a material capable of being used as a working binder or a foaming agent for ceramics or metal powders, in which PPC is melt-kneaded with polymethyl methacrylate (PMMA) in different compositions to thereby make the decomposition temperature of the blend material shifted to a high-temperature side by increasing the PMMA ratio therein (see, Patent Document 1).

As in Non-Patent Document 3, a blend is produced by melt-kneading PPC with ethylene-vinyl alcohol copolymer (EVOH), thereby improving the mechanical properties thereof and increasing the thermal decomposition temperature thereof.

Also there is an invention of melt-kneading PPC with polyvinyl acetate (PVAc) in different compositions to thereby improve the mechanical properties of the blend material (see, Patent Document 2).

In Non-Patent Document 4, first a filler (montmorillonite) is dissolved in a benzene solution, then PPC is added to the solution and stirred for a few hours thereby to intercalate PPC in the layer of montmorillonite, and thereafter the solvent is removed to form a film.

Improving the mechanical properties is the principal purpose, but contrary to expectations, the result is that the elastic modulus increased merely by around 2 times or so.

The conventional cases are investigated, and the results in Patent Document 1, Patent Document 2 and Non-Patent Document 3 are as follows: In case where PPC is blended with a resin according to a melt-kneading method, but when the resin is not incorporated in an amount of more than 50% by weight of PPC, then the PPC blend could not exhibit mechanical properties comparable to or better than those of low-density polyethylene that is a typical one of general-purpose resins.

Although for improving the properties of PPC, it is not desirable to reduce the PPC ratio to 50% by weight or less in compounding it with any other resin, for attaining the original purpose intended to fixation technology. Specifically, 43% by weight of $CO_2$ is fixed in the main chain of PPC. In case where compounding PPC with any other resin in an amount of at least 50% by weight is needed, then the result is that the weight ratio of $CO_2$ in the total blend would reduce to at most 20% and the $CO_2$ reducing effect would be seriously impaired, therefore not providing an appealing technology. As in Non-Patent Document 4, the "solution method" using an organic solvent is hardly applicable to a bulk material, and could not be said to be a process suitable for industrialization.

Given the technical background as above and principally aiming to improve PPC, especially to improve the mechanical properties and the heat resistance thereof, we the present inventors have concentrated our efforts on compounding PPC with any other resin according to a melt-kneading method while reducing the blend ratio to at most 50% by weight and further making the resulting blend material exhibit mechanical properties comparable to or better than those of low-density polyethylene, polypropylene and the like that are typical ones of general-purpose resins.

CITATION LIST

Patent Documents

Patent Document 1: U.S. patent Ser. No. 07/326,938
Patent Document 2: U.S. Pat. No. 4,912,149

Non-Patent Documents

Non-Patent Document 1: S. Inoue, H. Koinuma, and T. Tsuruta, J. Polym. Sci., Polym. Lett., Ed., 7, 287(1969).
Non-Patent Document 2: S. Inoue, H. Koinuma, and T. Tsuruta, Makromol. Chem., 130, 210 (1969).
Non-Patent Document 3: X. L. Wang, F. G. Du, J. Jiao, Y. Z. Meng, R. K. Y. Li, J. Biomed. Mater. Res., B, 78B, 373 (2007).
Non-Patent Document 4: Xudong Shi, Zhihua Gan, Eur. Polym. J., 43, 4852 (2007).

SUMMARY OF THE INVENTION

Technical Problem

The present invention is to provide an aliphatic polycarbonate (APC) that is an alternate copolymer of carbon dioxide and epoxide, a novel, carbon dioxide-derived aliphatic polycarbonate blend with APC, an aliphatic polycarbonate (APC) that is an alternate copolymer of carbon dioxide and epoxide, as blended with a resin in an amount of at most 50% by weight of APC, and to provide a novel process for producing the blend, as well as a novel shaped article thereof and a novel shaping process for it.

Solution to Problems

The present inventors have newly found out the following points and have solved the above problems.

Merely blending (compounding) PPC with any other resin could slightly improve the mechanical properties of PPC like the blends in Patent Documents 1 and 2 and Non-Patent Document 3 as already shown above; and for drastically improving the properties thereof, the purpose could not be attained when the blend ratio of the other resin to be added is not increased up to at least 50% by weight.

However, the above would extremely detract from the $CO_2$ reducing effect. Accordingly, we considered that the first component resin PPC would have to be blended with a second component of a methacrylic resin or an aliphatic polyester having a high elastic modulus as a resin capable of greatly improving the mechanical properties of PPC, in an amount of from 20 to 30% by weight and, concurrently with it, a third component would be necessary that could be an "adhesive" or a "compatibilizer" to act for smoothing the presence of the two components in the internal structure to be formed by the blend, and we added a small amount of a vinylic resin.

As a result, in the ternary carbon dioxide-derived aliphatic polycarbonate blend, a structure having a smooth internal structure and close to a co-continuous structure is formed, and we have succeeded in significantly improving the mechanical properties thereof that could not be attained by the above-mentioned binary blend.

The novel composition blend is described below.

(1) A ternary blend composition comprising from 97 to 50% by weight of a first component resin of an aliphatic polycarbonate (APC) that is an alternate copolymer of carbon dioxide and epoxide, from 3 to 50% by weight of a second component resin of a methacrylic resin or an aliphatic polyester, and from 1 to 20% by weight of a third component resin of a vinylic resin, wherein the second component resin domain existing in the first component resin matrix exists as a co-continuous structure state via the third component resin binder therein.

(2) A process for producing a carbon dioxide-derived aliphatic polycarbonate blend, which comprises an inputting step of inputting a carbon dioxide-derived aliphatic polycarbonate as a main component, or that is, an aliphatic polycarbonate (APC) of an alternate copolymer of carbon dioxide and epoxide and at least two types of resins other than it, into a melt-kneading zone equipped with a cylinder, a screw, a sample-inputting zone and a heating zone, from the sample-inputting zone, and a melt-kneading step of melt-kneading the resins heated at a temperature higher than the glass transition point thereof in case where the resins are amorphous resins or at a temperature higher than the melting point thereof in case where the resins are crystalline resins.

(3) The process for producing a carbon dioxide-derived aliphatic polycarbonate blend, wherein the resins include at least one resin of a methacrylic resin or an aliphatic polyester as the other component than the aliphatic polycarbonate.

(4) The process for producing a carbon dioxide-derived aliphatic polycarbonate blend, wherein the resins include an aliphatic polycarbonate as the main component, include at least one resin described in the above (3), and include a vinylic resin as the third component.

Preferably, the resins contain from 1 to 20% by weight of a vinylic resin and further from 0 to 10% by weight of a filler, relative to from 97 to 50% by weight of the aliphatic polycarbonate and from 3 to 50% by weight of the methacrylic resin or the aliphatic polyester.

Preferably, the aliphatic polycarbonate is an alternate copolymer where polypropylene oxide is used as the epoxide, or that is, poly(propylene carbonate) (PPC).

Preferably, the methacrylic resin is any of polymethyl methacrylate (PMMA), polyethyl methacrylate (PEMA) and polybutyl methacrylate (PBMA).

Preferably, the aliphatic polyester is a biodegradable aliphatic polyester or a copolymer thereof selected from polylactic acid (PLLA), polyglycolic acid (PGA), polybutylene succinate (PBS), copolymer of PBS copolymerized with succinic acid (PBSA) or poly($\epsilon$-caprolactone) (PCL) or polybutylene adipate-butylene terephthalate copolymer (PBAT).

Preferably, the vinylic resin is polyvinyl acetate (PVAc) or ethylene-vinyl acetate copolymer (EVA with a VA content of from 5 to 90% by weight).

Preferably, the filler to be contained in the resin includes at least one of phyllosilicates (clay minerals or clay, including those processed for organization), mica, silica fine particles, caged silica compounds (POSS), etc.

The melt-kneaded resin may be shaped through extrusion to give an extrudate.

For solving the above-mentioned problems, the invention provides an extrudate that is characterized by production process according to the above-mentioned melt-kneading method.

The extrudate is any one of rods, films, sheets and fibers.

Preferably, the extrudate has mechanical properties of such that its elastic modulus at 25° C. is at least 1 GPa and its elongation at break is at least 300%.

Preferably, the resin shaped article is a material having, when formed into a film having a thickness of 100 μm, a transmittance of at least 80% in a visible wavelength region of from 400 nm to 700 nm.

Advantageous Effects of the Invention

According to the invention, PPC is blended with a second component of a methacrylic resin or an aliphatic polyester as a resin with a good prospects of greatly improving the mechanical properties of PPC, in an amount of from 20 to 30% by weight and, concurrently with it, a small amount of a vinylic resin as a third component that is made to act as a compatibilizer for smoothing the internal structure of the blend is added. As a result, in the ternary carbon dioxide-derived aliphatic polycarbonate blend, a structure having a smooth internal structure and close to a co-continuous structure is formed, and the inventors have succeeded in significantly improving the mechanical properties thereof that could not be attained by any binary blend.

Specifically, according to the invention, in the ternary carbon dioxide-derived aliphatic polycarbonate blend with a small amount of a vinylic resin added thereto as a third component, a structure having a smooth internal structure and close to a co-continuous structure is formed; and polymer blend extrudates (including films and sheets) having excellent mechanical properties that could not be attained by binary blends can be produced.

The material having such a structure can synergistically exhibit the properties intrinsic to the polymers that constitute the blend, as compared with a material having a sea/island structure (so-called "island structure") where the dispersion phase size is large (on an order of a few micron meters or more) owing to phase separation therein, and therefore, it is possible to create an extremely high-performance, high-function and high-value-added material.

The production process of the invention is a simple process of mere melting-kneading by the use of an ordinary melt extruder or extrusion shaping machine, therefore providing a process most suitable not only to general-purpose materials such as wrapping materials, structural material and others but also to optical materials and electronic/electric materials that need a continuous, pure and fine structure.

In Examples given below, there is shown only a case of a polypropylene carbonate (PPC)/polymethyl methacrylate (PMMA)/polyvinyl acetate (PVAc) blend; however, even when polyethyl methacrylate (PEMA) or polybutyl methacrylate (PBMA) is used as the methacrylic resin in place of polymethyl methacrylate, the same result can be obtained. In addition, even when an aliphatic polyester is used in place of the methacrylic resin, the same result can also be obtained. Further, even when ethylene-vinyl acetate copolymer (EVA with a VA content of from 5 to 90% by weight) is used in place of polyvinyl acetate (PVAc) as the vinylic resin, the same result can also be obtained.

DETAILED DESCRIPTION OF THE PREFERRED EMBODIMENTS

Figure 1:
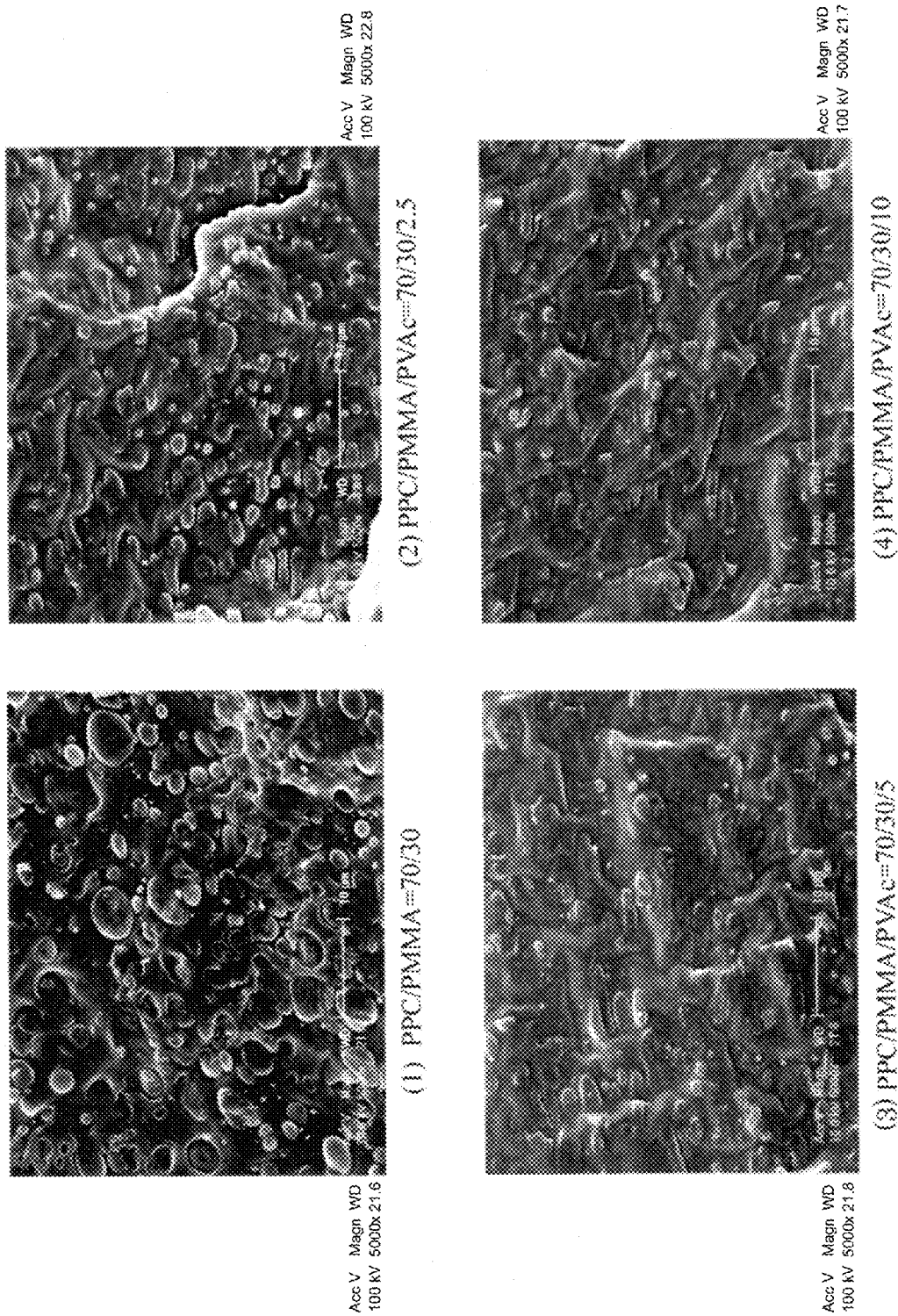
FIG. 1 SEM pictures of binary blend PPC/PMMA and ternary blends PPC/PMMA/PVAc (1: PPC/PMMA=70/30, 2: PPC/PMMA/PVAc=70/30/2.5, 3: PPC/PMMA/PVAc=70/30/5, 4: PPC/PMMA/PVAc=70/30/10).

The invention is a ternary blend composition containing from 1 to 20% by weight of a third component resin of a vinylic resin relative to from 97 to 50% by weight of a first component resin of an aliphatic polycarbonate (APC) that is an alternate copolymer of carbon dioxide and epoxide and from 3 to 50% by weight of a second component resin of a methacrylic resin or an aliphatic polyester (totaling 100% by weight), wherein the second component resin domain existing in the first component resin matrix exists as a co-continuous structure state via the third component resin binder therein.

The best mode for carrying out the carbon dioxide-derived aliphatic polycarbonate blend and its production process of the invention is described below.

In the invention, using a micro-volume high-shear processing machine mounted with an internal-return screw (Imoto Machinery's HSE3000mini), the screw is rotated under the condition of a single-screw rotation number of from 50 rpm to 300 rpm and a shear rate of from 75 to 450 sec$^{-1}$, and the resins are heated at a temperature higher than the glass transition point thereof in case where the resins are amorphous resins or at a temperature higher than the melting point thereof in case where the resins are crystalline resins, thereby melt-kneading a ternary blend, PPC/PMMA/PVAc. The "extrudate" to be produced in the invention may be an extrudate in a merely kneaded state (this may be referred to as "kneaded matter") or may also be an extrudate shaped into a sheet or the like (this may be referred to as "shaped article").

In the invention, the above-mentioned, micro-volume high-shear processing machine mounted with an internal-return single screw is used, to which, however, the invention is not limited. Any ordinary single-screw or double-screw kneading extruder or Banbury-type kneader may be used to attain the same result.

However, these processing machines are not mounted with an internal-return single screw, in which, therefore, the kneading time must be set sufficiently long.

A case of producing a novel polymer blend extrudate is described below, for which the ternary polymer blend is prepared to comprise from 80 to 60% by weight of polypropylene carbonate (PPC), from 20 to 40% by weight of polymethyl methacrylate (PMMA) and from 2 to 10% by weight of polyvinyl acetate (PVAc).

The aliphatic polycarbonate is an alternate copolymer (PPC) in which polypropylene oxide is used as the epoxide.

The methacrylic resin is selected from polymethyl methacrylate (PMMA), polyethyl methacrylate (PEMA) and polybutyl methacrylate (PBMA).

The aliphatic polyester is a biodegradable aliphatic polyester or a copolymer thereof selected from polylactic acid (PLLA), polyglycolic acid (PGA), polybutylene succinate (PBS), copolymer of PBS copolymerized with succinic acid (PBSA) or poly(ε-caprolactone) (PCL) or polybutylene adipate-butylene terephthalate copolymer (PBAT).

The vinylic resin is polyvinyl acetate (PVAc) or ethylene-vinyl acetate copolymer (EVA with a VA content of from 5 to 90% by weight).

For kneading the above ternary resin mixture, the mixture is mixed in the state of granules. In mixing, the samples previously bought as produced products, PPC and PVAc are dried in vacuum at 45° C. to 50° C. for 24 hours and PMMA is dried in vacuum at 80° C. for 24 hours, and thereafter these are weighed each in a predetermined amount, put in one container and fully stirred therein.

For solving the problems, the present inventors have made assiduous studies and developments, and as a result, have melt-kneaded the above-mentioned ternary resin mixture, using a micro-volume high-shear processing machine mounted with an internal-return screw in which the screw is rotated under the condition of a single-screw rotation number of from 50 rpm to 300 rpm and a shear rate of from 75 to 450 sec$^{-1}$. Briefly, the ternary blend, PPC/PMMA/PVAc is melt-kneaded for from 1 minute to 10 minutes under the heating condition of a temperature, taken as a guide, higher than the glass transition point thereof in case where the resins are amorphous resins, or a temperature higher than the melting point thereof in case where the resins are crystalline resins. The "extrudate" to be produced in the invention may be an extrudate in a merely kneaded state (this may be referred to as "kneaded matter") or may also be an extrudate shaped into a sheet or the like (this may be referred to as "shaped article").

Immediately after shaped, the mechanical properties of the resin shaped article are measured, and the inventors have gained an epoch-making finding that the elastic modulus thereof is at least 2 GPa at 25° C. and the elongation at break thereof is at least 300%.

As in the above, according to the invention, melt-kneading the ternary resin gives a novel carbon dioxide-derived aliphatic polycarbonate blend in which a smooth interface and a structure similar to a co-continuous structure are formed that could not be attained in a binary PPC/PMMA blend.

In case where the above-mentioned micro-volume high-shear processing machine mounted with an internal-return screw is used, for the shaping condition, it is important not only to set the specific temperature as above but also to specifically set the screw rotation number and the kneading time in the processing machine.

In the invention, the screw rotation number may be set to be from 50 to 300 rpm and the kneading time may be from 1 minute to 10 minutes; however, when the rotation number and the kneading time are set at 100 rpm and for from 2 to 6 minutes, respectively, then the best result could be obtained.

The invention is characterized in that the composition ratio of polymethyl methacrylate (PMMA) is controlled to be from 3 to 50% by weight, preferably from 20 to 40% by weight relative to from 97 to 50% by weight, preferably from 80 to 60% by weight of carbon dioxide-derived poly(propylene carbonate) (PPC) and that, as a third component, polyvinyl acetate (PVAc) is added to the binary blend in a controlled amount of from 1 to 20% by weight, preferably from 2 to 10% by weight thereby optimizing the weight ratio of PVAc in correlation with the mechanical properties. In the invention, good results can be obtained only by combining the specific conditions, and in case where even any one of the composition of the binary blend and the optimized weight ratio of PVAc thereto falls outside the above-mentioned condition, then satisfactory results could not be obtained.

In particular, when the usage ratio of the second component, methacrylic resin in the binary blend is less than 3% by weight, then improving the mechanical properties is thereby degraded; and when more than 50% by weight, then the significance of materialization as a carbon dioxide-reducing technology is diminished, and is thereby unfavorable. Further, when the usage ratio of the third component, vinylic resin in forming the ternary blend is less than 1% by weight or more than 20% by weight, then the lubricant effect of forming a finer microstructure in the binary blend is diminished and, as a result, the mechanical properties may be degraded, and is thereby unfavorable.

A quaternary blend composition of a carbon dioxide-derived aliphatic polycarbonate blend containing from 1 to 20% by weight of a third component resin of a vinylic resin and from more than 0 to 10% by weight of a fourth component filler relative to from 97 to 50% by weight of a first component resin of an aliphatic polycarbonate (APC) that is an alternate copolymer of carbon dioxide and epoxide and from 3 to 50% by weight of a second component resin of a methacrylic resin or an aliphatic polyester (totaling 100% by weight), wherein the second component resin domain existing in the first component resin matrix exists as a co-continuous structure state via the third component resin binder and the fourth component therein.

The aliphatic polycarbonate is an alternate copolymer (PPC) where polypropylene oxide is used as the epoxide.

The methacrylic resin is selected from polymethyl methacrylate (PMMA), polyethyl methacrylate (PEMA) and polybutyl methacrylate (PBMA).

The aliphatic polyester is a biodegradable aliphatic polyester or a copolymer thereof selected from polylactic acid (PLLA), polyglycolic acid (PGA), polybutylene succinate (PBS), copolymer of PBS copolymerized with succinic acid (PBSA) or poly(ε-caprolactone) (PCL) or polybutylene adipate-butylene terephthalate copolymer (PBAT).

The vinylic resin is polyvinyl acetate (PVAc) or ethylene-vinyl acetate copolymer (EVA with a VA content of from 5 to 90% by weight).

The fourth component filler includes at least one selected from phyllosilicates (clay minerals or clay, including those processed for organization), mica, silica fine particles, caged silica compounds (POSS).

For kneading the above ternary resin mixture and the fourth component filler, the mixture is mixed in the state of granules. In mixing, the samples previously bought as produced products, PPC and PVAc are dried in vacuum at 45° C. to 50° C. for 24 hours and PMMA and the fourth component filler are dried in vacuum at 80° C. for 24 hours, and thereafter these are weighed each in a predetermined amount, put in one container and fully stirred therein.

As a result of assiduous studies and developments, the present inventors have melt-kneaded the above-mentioned ternary resin mixture, using a micro-volume high-shear processing machine mounted with an internal-return screw in which the screw is rotated under the condition of a single-screw rotation number of from 50 rpm to 300 rpm and a shear rate of from 75 to 450 sec$^{-1}$. Briefly, the quaternary blend, PPC/PMMA/PVAc with the fourth component filler is melt-kneaded for from 1 minute to 10 minutes under the heating condition of a temperature, taken as a guide, higher than the glass transition point thereof in case where the resins are amorphous resins, or a temperature higher than the melting point thereof in case where the resins are crystalline resins. The "extrudate" to be produced in the invention may be an extrudate in a merely kneaded state (this may be referred to as "kneaded matter") or may also be an extrudate shaped into a sheet or the like (this may be referred to as "shaped article").

Immediately after shaped, the mechanical properties of the resin shaped article are measured, and the inventors have gained an epoch-making finding that the elastic modulus thereof is at least 2 GPa at 25° C. and the elongation at break thereof is at least 300%.

The invention provides a carbon dioxide-derived aliphatic polycarbonate blend shaped article produced by shaping according to a shaping process.

The shaped article is any one of rods, films, sheets and fibers.

The shaped article has mechanical properties of such that its elastic modulus at 25° C. is at least 1 GPa and its elongation at break is at least 100%.

The shaped article is a material excellent in transparency, as having, when formed into a film having a thickness of 100 μm, a transmittance of at least 80% in a visible wavelength region (400 nm to 700 nm).

EXAMPLES

Example 1

An example of the invention is described in which, as a ternary polymer blend, a carbon dioxide-derived aliphatic polycarbonate blend is produced from PPC, PMMA and PVAc. In this example, the starting material PPC used is one produced by Changchun Institute of Applied, Chinese Academy of Sciences and having the properties shown in Table 1.

TABLE 1

| | | Notes |
|---|---|---|
| Mn(Da) | 108000 | GPC(mobile phase is methylene dichloride) |
| Mw(Da) | 447000 | |
| PDI | 4.14 | |
| fugitive constituent(%) | 0.3 | |
| ash content(%) | 0.7 | |
| propylene carbonate content(%) | 2.3 | Calculate from $^1$H-NMR |
| Tg(° C.) | 30.5 | DSC($N_2$, 10K/min) |

As for polymethyl methacrylate (PMMA), Sumipex LG21 (trade name) from Sumitomo Chemical was used.

As for Polyvinyl acetate (PVAc), one produced by Scientific Polymer Product Inc. and having a weight-average molecular weight (Mw) of 260000 was used.

Production Examples 1 to 4

PPC and PVAc were dried in vacuum at 45° C. to 50° C. for 24 hours and PMMA was dried in vacuum at 80° C. for 24 hours, and thereafter these were weighed each in a predetermined amount, put in one container and fully stirred and mixed therein at room temperature. Predetermined amount as referred to herein means that, to a composition of a binary blend which is prepared to comprise from 97 to 50% by weight of PPC and from 3 to 50% by weight of PMMA, a third component Polyvinyl acetate (PVAc) is added in an amount of 0% by weight (Production Example 1) relative to 100% by weight of the total of the binary blend, 2.5% by weight (Production Example 2), 5% by weight (Production Example 3) or 10% by weight (Production Example 4). About 5 g of the mixture was put into a micro-volume high-shear processing machine (Imoto Machinery's HSE3000mini), heated and melted at 155° C., kneaded for from 3 to 5 minutes at a screw rotation number of 100 rpm, and extruded out through the T-die. The process gave an extrudate having a good surface condition.

Production Examples 5 to 8

PPC and PVAc were dried in vacuum at 45° C. to 50° C. for 24 hours and PMMA was dried in vacuum at 80° C. for 24 hours, and thereafter these were weighed each in a predetermined amount, put in one container and fully stirred and mixed therein at room temperature. Predetermined amount as referred to herein means that, to a composition of a binary blend which is prepared to comprise from 97 to 50% by weight of PPC and from 3 to 50% by weight of PMMA, a third component polyvinyl acetate (PVAc) is added in an amount of 0% by weight (Production Example 1) relative to 100% by weight of the total of the binary blend, 2.5% by weight (Production Example 2), 5% by weight (Production Example 3) or 10% by weight (Production Example 4). About 50 g of the mixture was put into a Banbury-type small-sized kneader (Toyo Seiki Seisaku-Sho's KF70V), heated and melted at 155° C., and kneaded for from 3 to 5 minutes at a screw rotation number of 100 rpm. The process gave an extrudate having a good surface condition.

For observing the internal structure of these systems, the samples were fractured at a liquid nitrogen temperature, and the cross section thereof was observed with a scanning electronic microscope (SEM). As for SEM, Philips's XL-20 was used. The samples were observed by the SEM at an accelerating voltage of 10 kV.

In FIGS. 1, (1) to (4) are SEM pictures each showing the microscopic dispersion structure of the extrudate obtained in Production Examples 1 to 4. In this example, the microscopic dispersion structures each show the binary blend PPC/PMMA=70/30 (Production Example 1: FIG. 1 (1)) and the ternary blends PPC/PMMA/PVAc=70/30/2.5 (Production Example 2: FIG. 1 (2)), PPC/PMMA/PVAc=70/30/5 (Production Example 3: FIG. 1 (3)) and PPC/PMMA/PVAc=70/30/10 (Production Example 4: FIG. 1 (4)). The samples of Production Examples 5 to 8 gave exactly the same results.

As obvious from FIG. 1, in the binary blend PPC/PMMA=70/30 (FIG. 1 (1)), spheres of the PMMA phase (domain) each having a size of a few μm are observed in the PPC matrix, from which is it known that the two were not in a compatibilized state, or that is, they formed a phase-separated structure. As opposed to this, it is known that, when the third component PVAc was added in an amount of from 2.5% by weight to 10% by weight, then the PMMA phase (domain) became smaller in the ternary blend structure (FIG. 1 (2)), and further, the structure changed to one similar to a co-continuous structure (FIGS. 1 (3) and (4)) and the interfacial condition therein became extremely smooth.

The change in the surface condition is obvious from the SEM pictures observed as in FIG. 1. For investigating further finer microstructure change, the samples were observed with a transmission electronic microscope (TEM). As for TEM, JEOL's JEM 1230 was used. The samples were observed by the TEM at an accelerating voltage of 120 kV. The samples to be observed were cut into ultrathin sections each having a thickness of 70 nm, using an ultramicrotome at −120° C., and stained with a staining agent ($RuO_4$) for 20 minutes.

Figure 2:
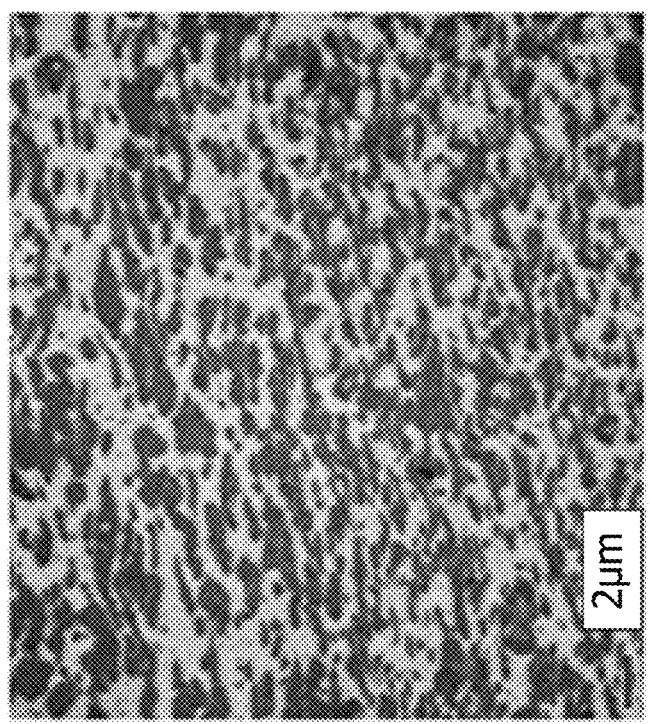
FIG. 2 TEM pictures of binary blend PPC/PMMA=70/30 (1) and ternary blend PPC/PMMA/PVAc=70/30/5 (2).
Figure 2:
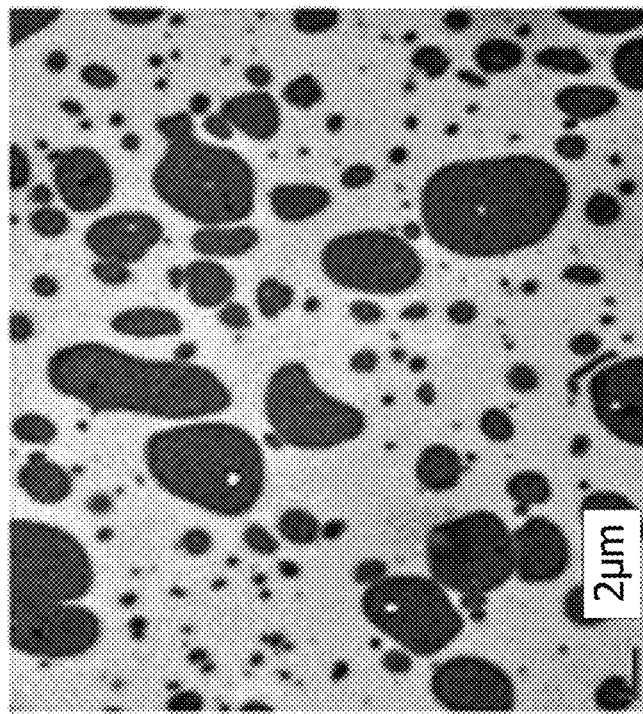

FIG. 2 shows a TEM picture of the binary blend PPC/PMMA=70/30 (FIG. 2(1)) and that of the ternary blend PPC/PMMA/PVAc=70/30/5 (FIG. 2(2)). As obvious from the pictures, the binary blend structure of FIG. 2(1) is still the "sea-island" structure, in which the matrix of the system is the white PPC phase and the black dispersion phase is PMMA. It is known that the structure of the ternary blend to which 5% PVAc had been added became a finer microstructure and formed a "co-continuous" structure, as in FIG. 2(2). Specifically, in this, both the white PPC phase and the black PMMA phase their structure changed to a microstructure and, in addition, the two were both elongated to be thin and formed a continuously-connected phase (continuous phase). The structure in which the phases of two different types of polymers are continuously connected is referred to as a co-continuous structure. Further, in FIG. 2, PVAc added in an amount of 5% could not be differentiated from the others since its amount was small, but it is considered that PVAc would serve as an adhesive between PPC and PMMA and accordingly the structure would have changed to a co-continuous microstructure.

For evaluating the mechanical properties of these series of samples, the samples were processed for dynamic mechanical analysis (DMA) and stress-strain measurement. For dynamic mechanical analysis, the samples were analyzed in a stretched mode using Rheovibron DDV-25FP-S (Orientec Co.). The measurement was carried out in a range of from −150° C. to 120° C., at a heating speed of 3° C./min and at a frequency of 1 Hz.

The stress-strain measurement was carried out as follows: A dumbbell-shaped sample was formed, and according to the test method of ASTM D412-80 and using a tensile tester Tensilon UMT-300 (Orientec Co.), the sample was tested at a crosshead speed of 10 ram/min and at a temperature of 25° C. and a humidity of 50%.

Figure 3:
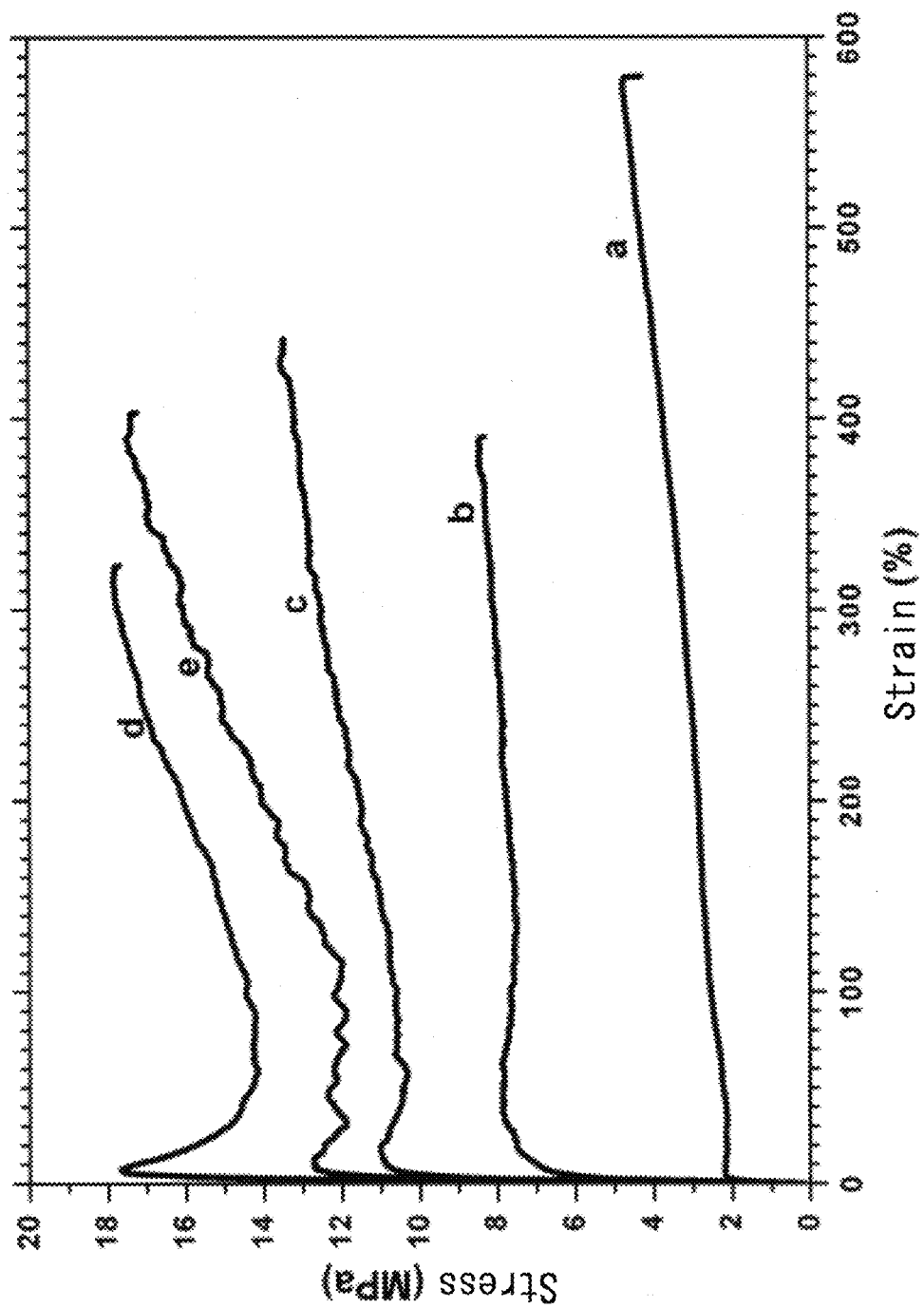
FIG. 3 Stress-strain curves of PPC alone (curve a), binary blend PPC/PMMA=70/30 (curve b) and ternary blends PPC/PMMA/PVAc (curves c to e) (c: PPC/PMMA/PVAc=70/30/2.5, d: PPC/PMMA/PVAc=70/30/5, e: PPC/PMMA/PVAc=70/30/10).

Stress-strain curves of PPC alone (curve a), binary blend PPC/PMMA=70/30 (curve b) and ternary blends PPC/PMMA/PVAc (curves c to e) are shown in FIG. 3.

As obvious from FIG. 3, the PPC alone (curve a) has an extremely small elastic modulus but is extremely excellent in elongation at break, therefore having rubber-like properties. It is known that the binary blend PPC/PMMA=70/30 (curve b) prepared by compounding PPC with PMMA has an improved elastic modulus as expressing the rigidity of PMMA, but its ductility lowered and its elongation at break reduced. Subsequently, when the third component PVAc is added in an amount of from 2.5% by weight (curve c) to 10% by weight (curve e), then it is known that the elastic modulus is further improved as compared with that of the binary blend. However, the increase in the elastic modulus is not merely proportional to the added amount of PVAc, or that is, it is known that the elastic modulus is the maximum when the added amount is 5% by weight (curve d) but rather lowers when the added amount is 10% by weight (curve e). Specifically, it has been clarified that the addition of the third component PVAc is effective for changing the internal structure of the blends to a structure similar to a co-continuous structure and for smoothing the interfaces therein, as shown in FIGS. 1 and 2, and is effective for extremely improving the mechanical properties of the systems, as shown in FIG. 3, but an optimum level exists for the amount of PVAc to be added.

Figure 4:
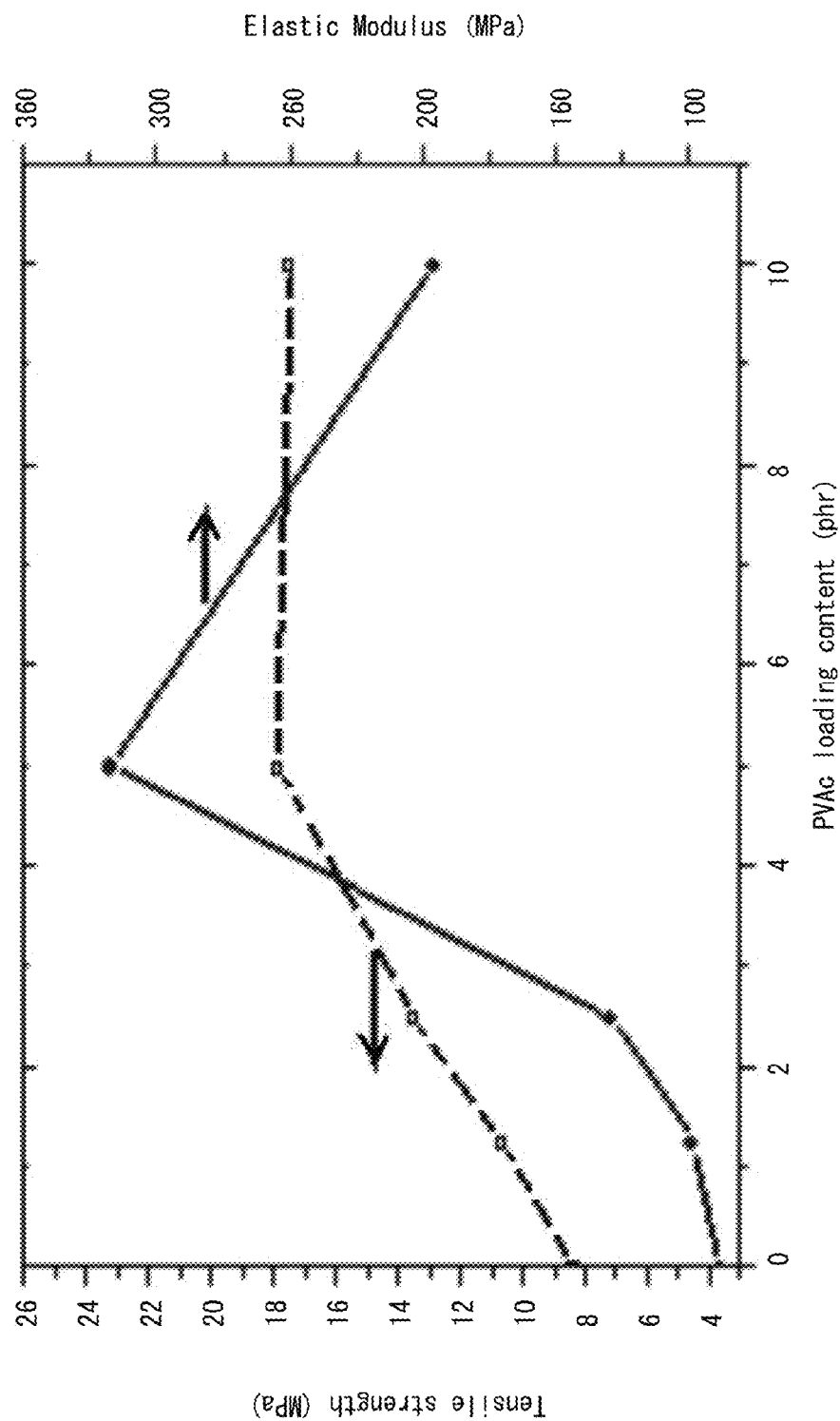
FIG. 4 PVAc content dependence of tensile strength (dotted line) and elastic modulus (solid line) of the mechanical properties (tensile strength and elastic modulus) of the binary blend PPC/PMMA=70/30 in the stress-strain characteristics of FIG. 3, as plotted relative to the added amount of PVAc.

The mechanical properties (tensile strength and elastic modulus) of the binary blend PPC/PMMA=70/30 in the stress-strain characteristics of FIG. 3 are shown in FIG. 4, as plotted relative to the added amount of PVAc therein. In FIG. 4, the dotted line shows the PVAc content dependence of the tensile strength, and the solid line shows the PVAc content dependence of the elastic modulus; and from the diagrams, it is known that an optimum level exists for the amount of PVAc to be added and that the mechanical properties are the highest when the added amount is 5% by weight.

Various mechanical properties, concretely the data of the storage elastic modulus, the tensile strength, the elongation at break and the glass transition temperature (Tg), as evaluated from the Stress-strain curves in FIG. 3 and from the dynamic mechanical analysis, are collectively shown in Table 2. For comparison, the mechanical properties of low-density polyethylene (LDPE) and isotactic-polypropylene (iso-PP) that are typical general-purpose resins are additionally shown in Table 2.

As obvious from Table 2, the elastic modulus of the PPC alone is extremely small (101 MPa) but the elongation at break thereof (578%) is excellent, which is readily presumed from FIG. 2. As opposed to this, it is known that the binary blend PPC/PMMA=70/30 prepared by compounding PPC with PMMA has an improved elastic modulus (1564 MPa) as expressing the rigidity of PMMA, but its ductility lowered and its elongation at break (390.6%) reduced. Subsequently, it is known that the ternary blend PPC/PMMA/PVAc=70/30/5 prepared by adding PVAc in an amount of 5% by weight has a dramatically increased elastic modulus (2431 MPa).

These mechanical properties are compared with those of general-purpose resins, and LDPE is characterized in that its elastic modulus (254 MPa) is extremely small but on the contrary its elongation at break (616%) is extremely excellent. It is known that iso-PP has more excellent properties of elastic modulus and elongation at break than LDPE. However, the ternary PPC/PMMA/PVAc=70/30/5 of the invention has attained elastic modulus that surpasses that of LDPE and iso-PP, and has expressed epoch-making properties.

As in the right column in Table 2 showing the glass transition temperature (Tg) of each sample, Tg of the ternary blend is higher than that of PPC alone by around 10° C., from which it is known that the heat resistance of the ternary blend has been extremely improved.

TABLE 2

Comparison in Mechanical Properties at room temperature (25° C.)

| Sample | Elastic Modulus (MPa)* | Strength (MPa) | Elongation at Break (%) | Tg (° C.)* |
|---|---|---|---|---|
| PPC | 101 | 4.8 | 578 | 30.4 |
| PPC/PMMA = 70/30 | 1564 | 8.4 | 390.6 | 36.7 |
| PPC/PMMA/PVAc = 70/30/5 | 2431 | 17.9 | 322 | 39.8 |
| LDPE | 247 | 16.6 | 616 | −128 |
| iso-PP | 1199 | 26.1 | 1077 | −0.1 |

(In the Table, the data with * are the results by dynamic mechanical analysis, and those with no mark are the results by stress-strain measurement.)

In the above, the best mode for carrying out the production process of the invention and the carbon dioxide-derived aliphatic polycarbonate blend produced according to the process is described with reference to Examples. Needless-to-say, however, the invention is not limited to such Examples, and there should be various Examples within the technical scope stated in Claims.

INDUSTRIAL APPLICABILITY

Industrial level production of PPC alone has begun; but as shown by the above data, at present, PPC that has only soft rubber-like properties could not be used as a practicable material. As opposed to this, when PPC is blended with a resin such as PMMA, then its mechanical properties could be improved in some degree, but are still unsatisfactory for practical use.

As opposed to this, in the invention, as described above, a third component resin is merely added in a specific ratio and in a small amount to give a ternary blend, whereby the properties of PPC alone are greatly improved and the ternary blend attains an elastic modulus that surpasses general-purpose resins LDPE and iso-PP, and expresses epoch-making properties.

Therefore, according to the invention, carbon dioxide is fixed in an aliphatic polycarbonate (APC) as the prime technology for carbon dioxide reduction for a measure against global warming, and the APC weight ratio in the ternary APC blend is made to be at least 50%, preferably at least 70%; and the ternary resin blend is expected to be widely utilized in industry as a substitute material for general-purpose resins with increasing the carbon dioxide reducing effect thereof.

The carbon dioxide-derived aliphatic polycarbonate blend developed by the invention could be a substitute for not only LDPE and iso-PP but also vinyl chloride, aromatic polycarbonates and the like, and is therefore of use in a whole range of fields of wrapping materials, structural materials, automobile materials, optical materials, etc.

The invention claimed is:

1. A ternary blend composition of a carbon dioxide-derived aliphatic polycarbonate blend, comprising: 97 to 50% by weight of a first component resin of an aliphatic polycarbonate (APC) that is an alternate copolymer of carbon dioxide and epoxide;
    3 to 50% by weight of a second component resin of a methacrylic resin; and
    1 to 20% by weight of a third component resin of a vinylic resin, wherein a glass transition temperature of the ternary blend is higher than that of the APC alone, and
    wherein the second component resin forms a domain existing in a matrix formed of the first component resin as a co-continuous structure state via the third component resin as a binder in between.

2. The carbon dioxide-derived aliphatic polycarbonate blend as claimed in claim 1, wherein the aliphatic polycarbonate is an alternate copolymer (PPC) where propylene oxide is used as the epoxide.

3. The carbon dioxide-derived aliphatic polycarbonate blend as claimed in claim 1, wherein the methacrylic resin is selected from polymethyl methacrylate (PMMA), polyethyl methacrylate (PEMA) and polybutyl methacrylate (PBMA).

4. The carbon dioxide-derived aliphatic polycarbonate blend as claimed in claim 1, wherein the vinylic resin is polyvinyl acetate (PVAc) or ethylene-vinyl acetate copolymer (EVA with a VA content of from 5 to 90% by weight).

5. A shaping process further comprising a shaping step of shaping the resin produced from the carbon dioxide-derived aliphatic polycarbonate blend of claim 1.

6. A carbon dioxide-derived aliphatic polycarbonate blend shaped article formed according to the shaping process of claim 5.

7. The carbon dioxide-derived aliphatic polycarbonate blend shaped article as claimed in claim 6, which is any one of rods, films, sheets and fibers.

8. The carbon dioxide-derived aliphatic polycarbonate blend shaped article as claimed in claim 7, which has elastic modulus of at least 1 GPa at 25° C. and elongation at break of at least 100%.

9. The carbon dioxide-derived aliphatic polycarbonate blend shaped article as claimed in claim 7, which is a material excellent in transparency and has, when formed into a film having a thickness of 100 μm, a transmittance of at least 80% in a visible wavelength region (400 nm to 700 nm).

10. The carbon dioxide-derived aliphatic polycarbonate blend as claimed in claim 1, where the third component resin is present in an amount of 1 to 10% by weight and the vinylic resin is polyvinyl acetate (PVAc).

11. The carbon dioxide-derived aliphatic polycarbonate blend as claimed in claim 1, wherein the methacrylic resin is polymethyl methacrylate (PMMA).

* * * * *